United States Patent [19]

Owoc et al.

[11] Patent Number: 4,513,779
[45] Date of Patent: Apr. 30, 1985

[54] METERING VALVE

[75] Inventors: James R. Owoc, McKeesport; John H. Thomas; Richard W. Conley, both of Pittsburgh, all of Pa.

[73] Assignee: Kerotest Manufacturing Corp., Pittsburgh, Pa.

[21] Appl. No.: 522,388

[22] Filed: Aug. 12, 1983

[51] Int. Cl.³ .................... F16K 37/00; F16K 41/10
[52] U.S. Cl. .................... 137/556; 251/87; 251/335 B
[58] Field of Search .............. 251/87, 335 B; 137/556

[56] References Cited

U.S. PATENT DOCUMENTS

| | | | |
|---|---|---|---|
| 1,799,677 | 4/1931 | Ziegler | 251/87 |
| 1,906,313 | 5/1933 | Clifford | 251/335 B |
| 2,994,343 | 8/1961 | Banks | 137/454.5 |
| 3,278,156 | 10/1966 | Callahan, Jr. et al. | 251/335 B |
| 3,491,789 | 1/1970 | Callahan et al. | 137/340 |
| 3,787,023 | 1/1974 | Shufflebarger et al. | 251/335 B |
| 4,099,703 | 7/1978 | Lush | 251/122 |
| 4,240,610 | 12/1980 | Trimble | 251/335 B |

FOREIGN PATENT DOCUMENTS

| | | | |
|---|---|---|---|
| 373832 | 4/1939 | Italy | 251/335 B |
| 1417343 | 12/1975 | United Kingdom | 251/335 B |

OTHER PUBLICATIONS

"Manually Operated Bellows Valves", Nupro Co., Willoughby, Ohio, 1973.

Primary Examiner—A. Michael Chambers
Attorney, Agent, or Firm—Stanley J. Price, Jr.; John M. Adams

[57] ABSTRACT

A valve body includes a chamber for the flow of fluid between an inlet and an outlet thereto. The chamber includes an upper portion with an opening therethrough and a lower portion including a valve seat between the inlet and outlet. A bonnet is positioned in the chamber upper portion and is connected to the valve body and extends upwardly therefrom. The bonnet includes a passageway, and a stem is positioned in the passageway for longitudinal movement into and out of sealing engagement with the valve seat. An actuator is rotatably positioned in the bonnet passageway above the stem. A micrometer operating handle is nonrotatably connected to the upper end portion of the actuator to facilitate fine adjustment of the stem position to provide incremental adjustments in the flow rate of fluid between the inlet and outlet. The stem upper end is spaced from the actuator lower end in the bonnet passageway, and a coupling assembly rigidly connects the actuator to the stem for conversion of longitudinal rotational movement of the actuator to nonrotational longitudinal movement of the stem. The coupling assembly includes a housing into which both the actuator and stem extend. The housing is retained on the end of the actuator, and a pin connects the housing to the stem. A bushing is positioned between the adjacent ends of the actuator and stem where one surface of the bushing abuts the actuator and an opposite surface abuts the stem. The stem is sealed in a bellows which exerts an upward compressive force upon the stem to maintain the actuator and stem in contact with the bushing so that, as the actuator rotates, the stem moves longitudinally relative to the valve seat.

16 Claims, 1 Drawing Figure

U.S. Patent    Apr. 30, 1985    4,513,779
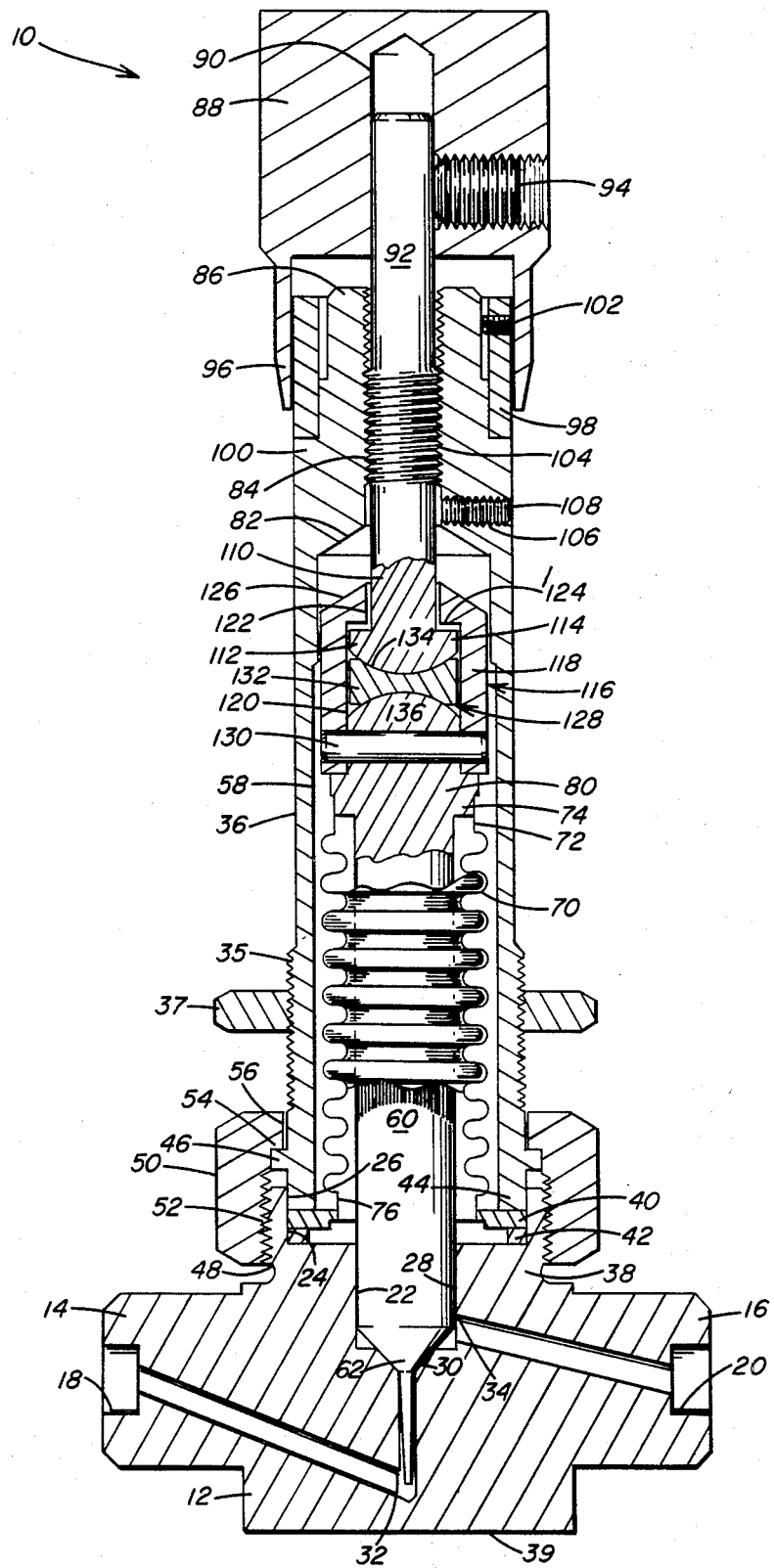

METERING VALVE

BACKGROUND OF THE INVENTION

1. Field of the Invention

This invention relates to a metering valve and, more particularly, to a valve for providing measurable fine flow control by nonrotational longitudinal movement of a valve stem sealed in a bellows and connected by a coupling to an actuator that is rotatably mounted for axial movement in a bonnet of the valve.

2. Description of the Prior Art

Metering bellows valves for precisely controlling the flow of toxic, corrosive, or expensive liquids or gases through a piping system are well known in the art. U.S. Pat. No. 3,428,291 is an example of a bellows metering valve having a nonrotating stem that is incrementally movable to assume accurate sealing of a valve member relative to a valve seat. In view of the fact that a bellows surrounds part of the stem and is connected to the upper end of the stem, the stem must be prevented from rotating and exerting torsional loads on the bellows when the actuator is threadedly rotated within a bonnet.

As disclosed in the above-identified patent, rotation of the stem upon rotation of the actuator is prevented by guiding the stem at its lower end by a washer and at its upper end by a bore in the bonnet where rotation of the stem is prevented by interaction of a flat on the washer with a corresponding flat on the stem. Fine adjustments of the flow rate through the valve are obtained by a differential thread mechanism that includes relatively coarse threads on the exterior of the bonnet and finer threads on the end of the valve stem with an actuator threadedly engaging with a first threaded portion the coarse threads on the bonnet and with a second threaded portion the fine threads on the valve stem. As the actuator is rotated relative to the bonnet and the stem, the stem advances a net amount equal to the difference in the pitch between the bonnet and the stem threads to provide accurate setting for the flow through the valve.

U.S. Pat. Nos. 3,278,156 and 3,428,291 disclose bellows metering valves in which the actuator is threadedly retained in the bonnet and includes a socket end portion having a conical recess for receiving a dome-shaped end portion of the valve stem. The end of the stem is retained in the conical recess by a pin extending through the conical recess and engaging a radial groove on the end of the stem within the recess. Longitudinal rotational advancement of the actuator generates non-rotational longitudinal movement of the valve stem as a result of the connection of the valve stem to the actuator.

U.S. Pat. Nos. 3,679,169 and 3,751,053 disclose high pressure needle valves in which a valve needle is non-rotatably retained in a valve body. An actuating stem is longitudinally rotationally mounted in the valve body and includes a socket-like end portion that receives an enlarged spherical end portion of the valve needle. A positive contact of the spherical end portion is maintained in the socket of the actuating stem so that rotational, longitudinal movement of the actuating stem is converted to non-rotational movement of the valve needle. U.S. Pat. No. 3,356,335 is another example of a metering valve that provides interconnecting means between a handle or actuator with the stem whereby rotational movement of the handle generates longitudinal movement of the stem without rotation of the stem.

While it has been suggested to provide metering valves with non-rotational longitudinally movable valve stems, some of the known mechanisms for connecting the rotational actuator to the stem include direct contact of the actuator with the stem. This means of connection, while effective to prevent rotation of the valve stem, is subject to wear at the point of contact of the stem with the actuator. The wear at this point between the actuator and the stem is undesirable, particularly in a metering valve where precise flow control is required. Consequently, the contacting parts must be frequently inspected to insure positive response of the valve stem to rotation of the actuator. The other known arrangements which provide for interconnecting means between the actuator and the stem in which the stem and the actuator do not contact each other require complex machining to assure that the desired accuracy of the flow control is maintained.

Therefore there is need in a metering valve, and particularly in a bellows metering valve, for an arrangement that connects the actuator to the valve stem in a manner that does not require complex machining and prevents wear of the connected parts where solid contact is maintained between the connection of the actuator to the valve stem in order to obtain precise, repeatable flow settings.

SUMMARY OF THE INVENTION

In accordance with the present invention, there is provided a valve that includes a valve body having a chamber therein. The chamber includes an upper portion with an opening therethrough and a lower portion having a valve seat. Inlet and outlet openings extend through the valve body and communicate with the valve seat. A bonnet is positioned in the chamber upper portion and is connected to the valve body. The bonnet has a passageway therethrough aligned with the chamber. A stem is positioned for longitudinal movement in the bonnet passageway. The stem includes a lower end portion extending into the chamber lower end portion and is adapted to sealingly engage the valve seat. The stem includes an upper end portion positioned in the bonnet passageway. An actuator is rotatably supported in the bonnet passageway above the stem. The actuator includes an upper end portion and a lower end portion. Coupling means is positioned in the bonnet passageway for connecting the actuator lower end portion to the valve stem upper end portion to convert rotation of the actuator to non-rotational longitudinal movement of the valve stem in the bonnet passageway to move the valve stem lower end portion into and out of engagement with the valve seat. The coupling means includes a housing with a bore therethrough. The actuator is positioned in the upper portion of the bore and is provided with means for retaining the actuator in the housing bore. The valve stem upper end portion is positioned in the lower portion of the housing bore in spaced relation with the actuator. The coupling means further includes means for rigidly connecting the valve stem upper end portion to the housing and a member positioned in the housing bore between the actuator and the valve stem upper end portion. The member has one surface abutting the actuator and an opposite surface abutting the valve stem upper end portion to maintain positive contact between the actuator and the valve stem through the member.

In one embodiment the member includes a bushing having opposed concave or arcuate surfaces. The actuator has an arcuately shaped end portion that complementary engages the upper surface of the bushing. The valve stem upper end portion also has an arcuately shaped end portion for complementary engagement with the opposite surface of the bushing.

A portion of the valve stem is enclosed by a bellows, which is connected at an upper end portion to the valve stem below the connection of the valve stem to the actuator. The bellows is installed around the valve stem in a precompressed state so as to apply an upward biasing force on the valve stem and provide positive contact between the valve stem and the actuator. This assures that rotation of the actuator is converted to longitudinal displacement of the valve stem for precise settings of the valve.

Another feature of the present invention includes the coupling housing having an internal shoulder positioned oppositely of a shoulder on the end portion of the actuator adjacent the bushing. The shoulder of the housing is maintained in close adjacency to the shoulder of the actuator by a pin extending through aligned bores in the valve stem and the housing so as to integrally connect the stem to the coupling means. In this manner, the coupling means serves as a tension member to exert an upward force upon the stem to maintain direct contact with the actuator in the event the compressive effect of the bellows is lost.

Accordingly, the principal object of the present invention is to provide a metering valve having a valve stem sealed in a bellows and connected to an actuator in a manner to assure positive contact between the actuator and the valve stem so that the valve stem is responsive to minute rotation of the actuator to precisely control the setting of the valve stem and flow through the valve.

Another object of the present invention is to provide a bellows sealed metering valve having an actuator to stem wear resistant connection to assure precise nonrotational longitudinal movement of the valve stem in response to minute rotation of the actuator.

A further object of the present invention is to provide in a metering valve a bellows for sealing a portion of the valve stem and exerting an upward compressive force to maintain the stem in positive contact through a coupling assembly to an actuator.

Another object of the present invention is to provide an actuator to stem connection for a metering valve in which positive contact is maintained between the actuator and the stem in a manner to reduce wear of the interconnecting parts and eliminate complexity of the connection between the stem and the actuator.

These and other objects of the present invention will be more completely disclosed and described in the following specification, the accompanying drawings and the appended claims.

BRIEF DESCRIPTION OF THE DRAWINGS

FIG. 1 is a sectional view, in side elevation, of a metering valve.

DESCRIPTION OF THE PREFERRED EMBODIMENTS

Referring to the FIGURE, there is illustrated a metering valve generally designated by the numeral 10 for precisely controlling the flow of fluid, such as a toxic, corrosive, or expensive liquid or gas through a piping system. The valve 10 includes a body portion 12 having a pair of conduit portions 14 and 16 communicating with ports 18 and 20 in the valve body 12. The ports 18 and 20 are adaptable to receive suitable compression couplings for connection to the conduits of a piping system.

The valve body 12 includes a chamber 22 having an upper portion 24 with an opening 26 therethrough and a lower portion 28 having a valve seat 30 therein. The conduit portions 14 and 16 include openings 32 and 34 respectively communicating with the chamber 22 for fluid flow between the ports 18 and 20 through the valve seat 30.

A bonnet 36 is positioned in the chamber upper portion 24 and closes the opening 26 in the chamber upper portion 24. The chamber upper portion 24 forms a counterbore in the valve body 12 and is adapted to receive on a shoulder 38 of the valve body 12 a bellows plate 40 and a gasket 42. Both the bellows plate 40 and the gasket 42 are supported by the valve body 12 surrounding the chamber upper portion 24 and include bores therethrough having a diameter greater than the diameter of the chamber 22 above the valve seat 30. The bonnet 36 has a lower end portion 44 that bears downwardly on the bellows plate 40. The lower end portion 44 includes an external shoulder 46 positioned above the valve body 12. The valve body 12 includes an externally threaded portion 48 positioned below the bonnet shoulder 46.

The bonnet 36 also includes an externally threaded portion 35 positioned above a union nut 50 and is adapted to receive a jam nut 37. The jam nut 37 is operable to permit panel mounting of the valve 10. In the alternative, the base 39 of the valve body 12 can be provided with tapped holes (not shown) to facilitate bottom mounting of the valve 10.

The union nut 50 includes an internally threaded bore 52 and an internal shoulder 54 surrounding a bore 56. The union nut 50 is advanced downwardly in surrounding relation with the bonnet 36 to a position where the bore 56 surrounds the bonnet 36 above the shoulder 46 and the nut internally threaded bore 52 engages the valve body externally threaded portion 48. The union nut 50 is threadedly advanced downwardly onto the valve body 12 so that the nut shoulder 54 bears against the bonnet shoulder 46 to urge the bonnet lower end portion 44 into bearing engagement with the bellows plate 40. Continued tightening of the nut 50 on the valve body 12 compresses the gasket 42 on the valve body shoulder 38. Thus, compression of the gasket 42 provides a fluid tight seal between the bonnet 36 and the valve body 12 around the valve chamber opening 26.

The bonnet 36 has a passageway 58 aligned with the valve body chamber 22. A valve stem 60 is positioned in the bonnet passageway 58 and includes a needle end portion 62 positioned in the chamber lower end portion 28. In the closed position of the valve 10, the needle end portion 62 sealingly engages the valve seat to prevent flow of fluid through the valve body 12 between the ports 18 and 20. In the open position of the valve 10, the needle end portion 62 is raised out of sealing engagement with the valve seat 30 to a selected position relative to the valve seat 30 corresponding to a preselected flow rate through the valve 10. With this arrangement, the needle end portion 62 is precisely positioned relative to the valve seat 30 to permit fine adjustments of the flow rate through the valve.

A fluid impervious bellows 70 surrounds a portion of the valve stem 60 in the bonnet passageway 58. The bellows 70 is preferably fabricated of metallic material, such as stainless steel, and includes an upper end portion 72 welded to an integral flange 74 of the stem 60 and a lower end portion 76 which extends into the bore of the bellows 70 and is welded to the bellows plate 40. With this arrangement, the bellows 70 hermetically seals the lower portion of the stem 60 within a primary pressure boundary and contains the fluid flowing throgh the valve 10 within the bellows 70 around the stem 60. Thus, in the event that fluid leaks upwardly through the valve seat 30 and around the stem 60 into the valve chamber upper portion 24, the fluid is contained in the bellows 70.

As will be explained later in greater detail, the stem 60 is nonrotatably, longitudinally movable in the bonnet passageway 58. As the stem needle end portion 62 is raised and lowered relative to the valve seat 30 corresponding to a preselected flow rate, the bellows 70 is longitudinally expandable and retractable to maintain a hermetic seal around the lower portion of the stem 60. By preventing rotational movement of the stem 60 as the needle end portion 62 is raised and lowered, torsional loading of the bellows 70 is prevented. Also, as will be explained later in greater detail, the bellows 70 is installed in a precompressed state on the stem 60 to normally exert an upward force such as a compression coil spring, upon the valve stem 60.

The bonnet passageway 58 includes a lower end portion 78 for receiving the bellows 70 and an upper end portion 79. The stem 60 is positioned in the bellows 70. An upper end portion 80 of the stem 60 extends out of the bellows 70. The bonnet passageway upper end portion 79 includes a conical recess 82, and an internally threaded bore 84 extends from the recess 82 upwardly through an upper end portion 86 of the bonnet 36.

Operation of the valve 10 for a preselected flow rate is controlled by rotation of a cup-shaped operating handle 88 that includes a bore 90 for receiving an actuator 92. The handle 88 is nonrotatably connected to the upper end of the actuator 92 by a set screw 94. The handle 88 includes a lower end portion 96 that is received over a sleeve 98 that is positioned around and abuts a shoulder 100 of the bonnet upper end portion 86. The sleeve 98 is nonrotatably connected to the bonnet upper end portion 86 by a set screw 102. The sleeve 98 includes a vernier scale, which is preferably graduated in 0.001 inch increments for metering minute flow rates through the valve 10. The vernier scale cooperates with the appropriate indicia on the handle lower end portion 96 to accurately indicate the flow rate through the valve 10.

The actuator 92 includes a portion 104 having a very fine thread pitch. The threaded portion 104 is threadedly received within the threaded bore 84 of the bonnet 36. The bonnet 36 also includes a transverse threaded bore 106 positioned below the threaded bore 84 for receiving a set screw 108 that is operable to engage the actuator 92 to prevent rotation of the actuator 92 and thereby lock the valve stem 60 in a desired position corresponding to a preselected flow rate.

The actuator 92 includes a lower end portion 110 that extends into the bonnet passageway 58 and includes an arcuately shaped head 112 having a peripheral shoulder 114. The actuator end portion 110 is connected to the stem upper end portion 80 by a coupling assembly, generally designated by the numeral 116. The coupling assembly 116 is positioned in the bonnet passageway 58 and is operable to connect the valve stem 60 to the actuator 92 in a manner to convert rotation of the actuator 92 to nonrotational, longitudinal movement of the valve stem 60. Longitudinal movement of the valve stem 60 moves the valve stem needle end portion 62 into and out of engagement with the valve seat 30. The coupling assembly 116 also serves to prevent the application of torsional loads on the bellows 70 when the actuator 92 is threadedly rotated within the bonnet 36.

The coupling assembly 116 includes a sleeve-like housing 118, a member 128 and a coupling pin 132. The housing 118 has a bore therethrough that includes an enlarged diameter portion 120 separated from a reduced diameter portion 122 by an internal shoulder 124 that is positioned opposite the shoulder 114 on the actuator head 112. The housing 118 also includes a conical shaped upper end portion 126 that is adaptable to be received within the conical recess 82 of the bonnet 36 and thereby limit the extent of upward movement of the valve stem 60 in tne bonnet 36.

The valve stem upper end portion 80 extends into the housing enlarged bore 120 and is maintained in spaced relation with the actuator head 112 by a member generally designated by the numeral 128. The stem upper end portion 80 is connected to the housing 118 by the provision of a coupling pin 130 that extends through aligned bores in the valve stem upper end portion 80 and the lower end portion of the housing 118. The coupling pin 130 maintains the housing 118 and the stem 60 as an integral unit. Thus, the coupling assembly 116 is operable as a compression device to maintain contact between the actuator 92 and the stem 60 through the member 128.

The member 128 includes in one embodiment a bushing 132 maintained in abutting contact with the actuator head 112 and the stem upper end portion 80. To accomplish a solid connection between the stem 60 and the actuator 92 without providing for direct contact of the valve stem upper end portion 80 with the actuator head 112, the bushing 132 is provided with complementary surfaces which coact with the arcuate surfaces on the stem end portion 80 and the actuator head 112. With this arrangement, the bellows 70, acting as a compression spring, applies an upward compressive force upon the stem 60 to maintain contact between the stem 60 and the actuator 92 through the bushing 132.

The bushing 132 is provided with an upper concave surface 134 that is complementary with the convex surface of the actuator head 112. Similarly, the bushing 132 is provided with a lower concave surface 136 that is complementary with the convex surface on the stem upper end portion 80. With this arrangement, the bushing 132 is compressed by the upward compressive force exerted by the bellows 70 between the adjacent end portions of the actuator 92 and the valve stem 80.

The connection of the coupling housing 116 at one end to the valve stem 60 and at the opposite end to the actuator 92 maintains solid contact between the actuator 92 and the valve stem 60 through the bushing 132. With the housing 118 being pinned to the valve stem 60, the upward compressive force exerted by the bellows 70 upon the stem 60 is transmitted to the housing 118 to maintain the valve stem 60 in contact with the bushing 132. This in turn maintains the bushing 132 in solid contact with the actuator head 112.

The bushing 132 is maintained compressed between the adjacent ends of the actuator 92 and the valve stem 60. However, in the event the compressive effect of the bellows 70 against the coupling assembly 116 is lost when the valve 10 is being opened, the coupling assembly 116 is operable, as a tension device, to maintain a rigid connection between the actuator 92 and the stem 60 where rotational movement of the actuator 92 is converted to nonrotational, longitudinal movement of the valve stem 60. Thus, in the event the compressive effect of the bellows 70 is lost when the valve is opened, the actuator shoulder 114 will engage the shoulder 124 of the housing 118 to lift the housing 118 upwardly and carry with it the valve stem 60 which is maintained coupled to the housing 118 by the pin 130.

With the metering valve 10 of the present invention, precise repeatable settings in minute flow rates through the valve 10 are obtained. A positive connection between the actuator 92 and the valve stem 60 is maintained during the operation of the valve 10. The connection provided by the coupling assembly 116 eliminates the problems of wear encountered when the actuator 92 and stem 60 are in direct contact. This connection avoids the problems heretobefore encountered with complex machining and provides a coupling that maintains the actuator 92 and stem 60 in spaced relation but connected as an integral unit in a manner to provide accurate movement of the valve needle end portion 62 in response to incremental rotational movement of the operating handle 88.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A valve comprising,
   a valve body having a chamber therein,
   said chamber including an upper portion with an opening therethrough and a lower portion having a valve seat,
   inlet and outlet openings extending through said valve body and communicating with said valve seat,
   a bonnet positioned in said chamber upper portion and connected to said valve body, said bonnet having a passageway therethrough aligned with said chamber,
   a stem positioned for longitudinal movement in said bonnet passageway,
   said stem including a lower end portion extending into said chamber lower end portion and being adapted to sealingly engage said valve seat,
   said stem including an upper end portion with an arcuate surface positioned in said bonnet passageway,
   an actuator rotatably supported in said bonnet passageway above said stem, said actuator including an upper end portion and a lower end portion with an arcuate surface,
   coupling means positioned in said bonnet passageway for connecting said actuator lower end portion to said stem upper end portion to convert rotation of said actuator to nonrotational, longitudinal movement of said stem in said bonnet passageway to move said stem lower end portion into and out of engagement with said valve seat,
   said coupling means including a housing with a bore therethrough,
   said actuator lower end portion being positioned in the upper portion of said bore and provided with means for retaining said actuator lower end portion in said housing bore,
   said stem upper end portion being positioned in the lower portion of said housing bore in spaced relation with said actuator lower end portion,
   a bushing positioned in said housing bore between said actuator lower end portion and said stem upper end portion,
   said bushing having a lower arcuate surface complementary with said arcuate surface of said stem upper end portion and an upper arcuate surface complementary with said arcuate surface of said actuator lower end portion,
   said bushing being positioned in positive contact with said stem upper end portion and said actuator lower end portion at said respective complementary arcuate surfaces, and
   a pin extending through said coupling means and said stem upper end portion to move said arcuate surface of said stem upper end portion into compressive relation with said bushing lower arcuate surface and urge said bushing upper arcuate surface into compressive relation with said arcuate surface of said actuator lower end portion to maintain solid contact between said stem and said actuator through said bushing by the coaction through said complementary arcuate surfaces.

2. A valve as set forth in claim 1 which includes,
   said means for retaining said actuator in said housing bore including said housing having a peripheral shoulder surrounding said housing bore,
   said actuator lower end portion having a peripheral shoulder positioned oppositely and below said housing peripheral shoulder, and
   said actuator peripheral shoulder being movable into abutting relation with said housing peripheral shoulder to prevent said actuator lower end portion from passing upwardly and out of said housing.

3. A valve as set forth in claim 1 in which said means for rigidly connecting said stem upper end portion to said housing includes,
   said stem upper end portion including a transverse bore therethrough,
   said housing including a transverse bore therethrough,
   said transverse bores of said stem upper end portion and said housing being aligned, and
   said pin extending through said aligned bores to maintain stem and said housing coupled as an integral unit.

4. A valve as set forth in claim 1 in which,
   said bushing upper and lower arcuate surfaces are maintained in abutting contact with said actuator lower end portion and said stem upper end portion whereby upward and downward movement of said actuator upon rotation thereof is transmitted to said stem for corresponding upward and downward movement without rotation of said stem.

5. A valve as set forth in claim 1 which includes,
   means for applying an upward compressive force upon said stem to maintain contact between said actuator and said stem through said bushing.

6. A valve as set forth in claim 1 in which, a bellows surrounding said stem in said bonnet passageway, said bellows having an upper end and a lower end, means for connecting said bellows upper end to said stem upper end portion and said bellows lower end to said valve body, and said bellows applying an upward compressive force upon said stem to maintain contact between said stem and said actuator through said bushing.

7. A valve as set forth in claim 1 which includes, a bellows surrounding said stem in said bonnet passageway, said bellows having an upper end and a lower end, and means for connecting said bellows upper end to said stem upper end portion and said bellows lower end to said valve body to provide a primary pressure boundary around said stem to contain the fluid flowing through the valve within said bellows and around said stem.

8. A valve as set forth in claim 7 in which, said bellows is longitudinally expandable and retractable between said upper and lower ends thereof, and said bellows being positioned around said stem in a precompressed state to normally exert an upwrd force upon said stem so that said stem is urged upwardly against said coupling means and said coupling means is urged upwardly against said actuator to assure a positive connection between said stem and said actuator.

9. A valve as set forth in claim 8 in which, said bellows upper end is welded to said stem to nonrotatably, longitudinally move with said stem in said bonnet passageway thereby preventing torsional loading of said bellows upon rotation of said actuator to open and close said valve.

10. A valve as set forth in claim 1 in which, said bonnet passageway includes an upper end portion having a conical configuration, said coupling means housing having a conical shaped end portion, and said housing conical shaped end portion being received within said bonnet passageway upper end portion to limit the extent of upward movement of said stem in said bonnet passageway.

11. A valve comprising, a valve body having a chamber therein, said chamber including an upper portion with an opening therethrough and a lower portion having a valve seat, inlet and outlet openings extending through said valve body and communicating with said valve seat, a bonnet positioned in said chamber upper portion and connected to said valve body, said bonnet having an upper end portion with a shoulder extending therearound, a sleeve having a smooth interior surface positioned around said bonnet upper end portion and in abutting relation with said bonnet shoulder to form a continuous surface with said bonnet, said sleeve including a vernier scale for indicating the flow rate through said chamber positioned on the exterior surface thereof, said bonnet having a passageway therethrough aligned with said chamber, a stem positioned for longitudinal movement in said bonnet passageway, said stem including a lower end portion extending into said chamber lower end portion and being adapted to sealingly engage said valve seat, said stem including an upper end portion positioned in said bonnet passageway, an actuator rotatably supported in said bonnet passageway above said stem, said actuator including an upper end portion and a lower end portion, an operating handle connected to said actuator upper end portion for rotation with said actuator, said operating handle including a lower end portion having a flow indicator thereon, said flow indicator on said operating handle being movably positioned in overlying relation with said vernier scale on said sleeve to indicate the flow rate through said chamber for the respective position of said stem relative to said valve seat, coupling means positioned in said bonnet passageway for connecting said actuator lower end portion to said stem upper end portion to convert rotation of said actuator to nonrotational, longitudinal movement of said stem in said bonnet passageway to move stem lower end portion into and out of engagement with said valve seat, a bellows surrounding said stem in said bonnet passageway, said bellows having an upper and a lower end, and means for connecting said bellows upper end to said stem below said actuator and said bellows lower end to said valve body to provide a seal around said valve stem.

12. A valve as set forth in claim 11 which includes, said stem having a flange, said bellows upper end being welded to said flange, a bellows plate supported by said valve body above said chamber upper portion and having a bore therethrough for receiving said stem, said bonnet having a lower end portion bearing downwardly on said bellows plate, and said bellows lower end being welded to said bellows plate.

13. A valve as set forth in claim 12 which includes, clamp means connected to said valve body for urging said bonnet into compressive relation with said bellows plate to provide a hermetic seal at said bellows lower end around said stem lower end portion to contain fluid within said bellows around said stem.

14. A valve comprising, a valve body having a chamber therein, said chamber including an upper portion with an opening therethrough and a lower portion having a valve seat, inlet and outlet openings extending through said valve body and communicating with said valve seat, a bonnet positioned in said chamber upper portion and connected to said valve body, said bonnet having a passageway therethrough aligned with said chamber, a stem positioned for longitudinal movement in said bonnet passageway, said stemm including a lower end portion extending into said chamber lower end portion and being adapted to sealingly engage said valve seat, said stem including an upper end portion positioned in said bonnet passageway, an actuator rotatably supported in said bonnet passageway above said stem, said actuator including an upper end portion and a lower end portion, coupling means positioned in said bonnet passageway for connecting said actuator lower end portion to said stem upper end portion to convert rotation of said actuator to nonrotational, longitudinal movement of said stem in said bonnet passageway to move said stem lower end portion into and out of engagement with said valve seat, a bushing retained in said coupling means and having opposite surfaces maintained in abutting relation with said actuator lower end portion and said stem upper end portion respectively to maintain solid contact between said actuator and said stem through said bushing, a bellows surrounding said stem lower end portion in said bonnet passageway, said bellows having an upper end and a lower end, and means for connecting said bellows lower end to said valve body and said bellows upper end to said stem so that said bellows applies an upward compressive force upon said stem to maintain said bushing in compressive contact with said stem and said actuator and thereby connect said stem and said actuator as an integral unit in spaced relation.

15. A valve as set forth in claim 14 in which, said bellows is fabricated of a metallic material and is maintained in a compressed state around said stem.

16. A valve as set forth in claim 15 in which, said stem has a flange, said bellows upper end being welded to said flange, a bellows plate supported by said valve body above said chamber upper portion and having a bore therethrough for receiving said stem, said bonnet having a lower end portion bearing downwardly on said bellows plate, and said bellows lower end being welded to said bellows plate.

* * * * *